E. BONNEVAL.
Car Brake and Starter.
No. 112,534.                    Patented March 14, 1871.
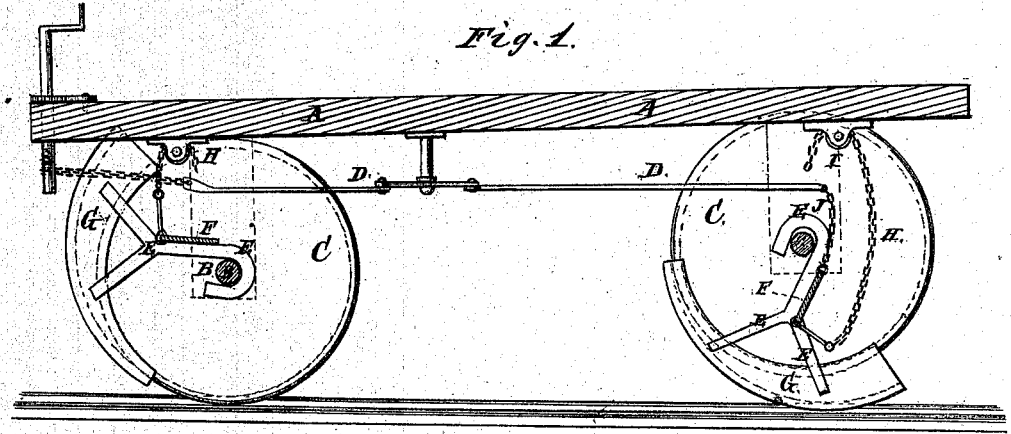
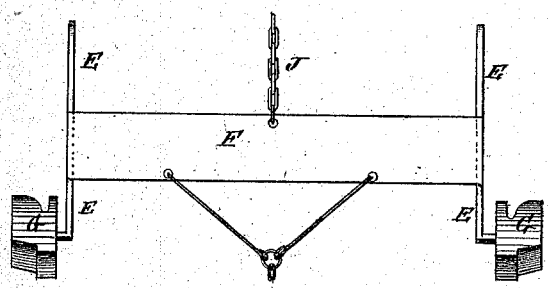
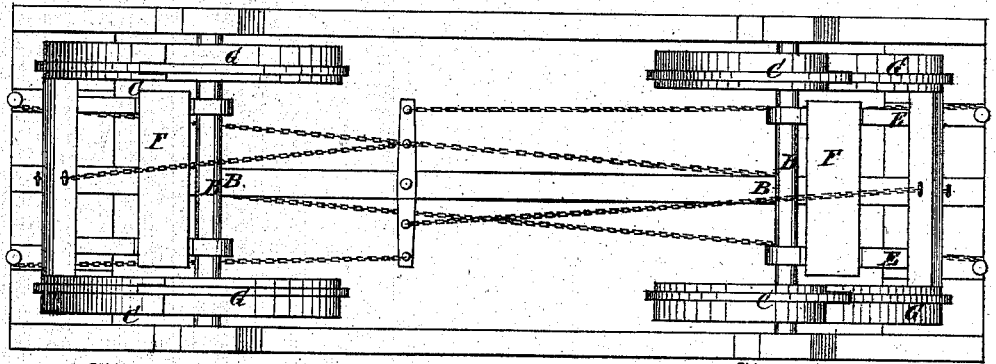

United States Patent Office.

EDUARDO BONNEVAL, OF BOSTON, MASSACHUSETTS.

IMPROVEMENT IN CAR BRAKES AND STARTERS.

Specification forming part of Letters Patent No. 112,534, dated March 14, 1871.

*To all whom it may concern:*

Be it known that I, EDUARDO BONNEVAL, of Boston, in the county of Suffolk and State of Massachusetts, have invented a new and useful Improvement in Combined Brake and Starter for Vehicles; and I do hereby declare that the following is a full, clear, and exact description thereof, which will enable others skilled in the art to make and use the same, reference being had to the accompanying drawings, forming part of this specification, in which—

Figure 1 is a vertical longitudinal section of a horse-car, to which my improvement has been attached. Fig. 2 is a detail view of the brake and starter. Fig. 3 is a bottom plan view of the car, showing the brake connected with the chains and sway-bars for operating them in the ordinary manner.

Similar letters of reference indicate corresponding parts.

My invention has for its object to furnish an improved brake for attachment to cars and other vehicles, and which shall be so constructed and arranged that it will stop and hold the vehicle when stopped upon an upgrade in such a way as to assist the motive power in starting and diminish the strain; and it consists in the construction and combination of the various parts of the device, as hereinafter more fully described.

A represents the body or frame of a car.

B are the axles.

C are the wheels, and D is the system of levers and chains, by means of which the brake is usually applied.

E are the suspension braces of the brake, upon the upper ends of which are formed hooks, eyes, loops, or other fastenings, by means of which it may be suspended from and pivoted to the axle or other convenient part of the vehicle-body. The two braces E of each brake are connected to each other and held in their proper positions by a plank, plate, or frame, F, as shown in Figs. 1 and 2. The lower ends of the braces E, which I prefer to make branched, are bent outward and are securely attached to the brake-shoes G. The shoes G are made in the shape shown in Fig. 1—that is to say, in the shape of a curved wedge—the inner or concave surface being made to fit upon the rim of the wheel to which it is to be applied, and the outer or convex surface being made upon a larger curve and eccentric to the inner curve to give the shoe the desired wedge form. The inner curve of the shoes G must always be made to fit upon the rim of the wheels, whether said rims be flanged or plain, and the outer curve or surface must be made to fit upon the rail when attached to a rail-car, and plain when attached to an ordinary road or pavement vehicle.

With the lower part of the plate, board, or frame F is connected one end of a chain, H, which passes over a pulley, I, pivoted to the bottom of the body or frame A of the vehicle, and which passes thence into such a position and is secured in such a way that it may be readily slackened by the driver to allow the brake to drop into the position shown at the right in Fig. 1, to hold and assist in starting the vehicle when stopped upon an upgrade, or drawn taut to raise the brake into its ordinary horizontal position, as shown at the left in Fig. 1.

To the upper part or edge of the plate, plank, or frame F is attached one end of the chain J, the other end of which is connected with the system of levers by which the ordinary brake is operated, so that when raised into a horizontal position it may be operated as an ordinary brake. When the vehicle is stopped upon an upgrade, the chain H is slackened, allowing the brake to drop, the sharp end of the shoes entering into the space between the wheels and the track or ground. Then, as the vehicle settles back, the wheels and shoes will take the position shown at the right in Fig. 1, blocking and raising the wheels in such a way that they will descend when the vehicle is started, and thus assist the motive power and diminish the strain in starting.

Having thus described my invention, I claim as new and desire to secure by Letters Patent—

1. The brake-shoes G, constructed in the form of a curved wedge, substantially as herein shown and described, to adapt them to the purpose set forth.

2. The combination of the braces E, plank, plate, or frame F, and shoes G with each other, substantially as herein shown and described, and for the purpose set forth.

3. The combination of the chains H and J, either or both, with the brake E F G, substantially as herein shown and described, and for the purposes set forth.

EDUARDO BONNEVAL.

Witnesses:
CHAS. H. ALMY,
J. M. AGUAYO.